(12) United States Patent
Polocoser et al.

(10) Patent No.: US 9,260,084 B2
(45) Date of Patent: Feb. 16, 2016

(54) WIPER COUPLER ADAPTER AND WIPER ASSEMBLY INCORPORATING SAME

(71) Applicant: TRICO PRODUCTS CORPORATION, Rochester Hills, MI (US)

(72) Inventors: Mitica Polocoser, Wayne, MI (US); Kyle Moll, Oxford, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 254 days.

(21) Appl. No.: 13/733,458

(22) Filed: Jan. 3, 2013

(65) Prior Publication Data
US 2014/0182075 A1 Jul. 3, 2014

(51) Int. Cl.
*B60S 1/40* (2006.01)
*B60S 1/38* (2006.01)

(52) U.S. Cl.
CPC ............ *B60S 1/4048* (2013.01); *B60S 1/3849* (2013.01); *B60S 2001/4051* (2013.01); *B60S 2001/4054* (2013.01)

(58) Field of Classification Search
CPC ........ B60S 1/40; B60S 1/4045; B60S 1/4048; B60S 1/4064; B60S 1/3849; B60S 2001/4051; B60S 2001/4054
USPC ....................................... 15/250.32, 250.351
See application file for complete search history.

(56) References Cited

U.S. PATENT DOCUMENTS

| 2,589,339 A | 3/1952 | Carson |
| 2,616,112 A | 11/1952 | Smulski |
| 2,643,411 A | 6/1953 | Nesson |
| 2,799,887 A | 7/1957 | Nemic |

(Continued)

FOREIGN PATENT DOCUMENTS

| DE | 1028896 B | 4/1958 |
| DE | 1247161 B | 8/1967 |

(Continued)

OTHER PUBLICATIONS

Apr. 16, 2014 International Search Report and Written Opinion for PCT/US2013/077986.

*Primary Examiner* — Gary Graham
(74) *Attorney, Agent, or Firm* — Howard & Howard Attorneys PLLC

(57) ABSTRACT

A wiper coupler adaptor for releasably attaching a wiper assembly to a wiper arm includes a pair of sidewalls each including a post that extends laterally toward the other and adapted to operatively engage a wiper assembly. The sidewalls include recessed sections adapted to operatively engage rails of an attachment member of a wiper arm, each of the recessed sections have a flange that extends outward beyond to provide releasable engagement with the attachment member. The wiper coupler adaptor also includes a deck disposed between the sidewalls to define a rest that is adapted to operative receive a track between the rails of the attachment member, an elevated platform disposed between the sidewalls and the deck to define an aperture adapted to receive a portion of a bent tab of the attachment member, and a snap bridge disposed within the aperture including a lip depending therefrom that is adapted to receive a portion of the bent tab of the attachment member to prevent undesired release of said wiper coupler adaptor from the attachment member.

6 Claims, 11 Drawing Sheets

(56) References Cited

U.S. PATENT DOCUMENTS

| | | |
|---|---|---|
| 2,801,436 A | 8/1957 | Scinta |
| 2,814,820 A | 12/1957 | Elliott et al. |
| 2,932,843 A | 4/1960 | Zaiger et al. |
| 2,937,393 A | 5/1960 | Brueder |
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,147,507 A | 9/1964 | Glynn |
| 3,179,969 A | 4/1965 | Glynn |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,780,395 A | 12/1973 | Quinlan et al. |
| 3,845,519 A | 11/1974 | Quinlan et al. |
| 3,862,465 A | 1/1975 | Ito |
| 3,872,537 A | 3/1975 | Bianchi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schon et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,392,487 A | 2/1995 | Yang |
| 5,392,489 A | 2/1995 | Mohnach |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 5,956,801 A | 9/1999 | Jeffer et al. |
| 6,000,093 A | 12/1999 | Charng |
| 6,158,078 A | 12/2000 | Kotlarski |
| 6,161,249 A | 12/2000 | Hussaini |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 | 7/2003 | Jarasson |
| 6,611,988 B1 | 9/2003 | De Block |
| 6,625,842 B1 | 9/2003 | De Block |
| 6,634,056 B1 | 10/2003 | De Block |
| 6,654,983 B1 | 12/2003 | Raynaud |
| 6,665,905 B2 | 12/2003 | Wegner et al. |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,836,924 B2 | 1/2005 | Egan-Walter |
| 6,836,926 B1 | 1/2005 | De Block |
| 6,944,905 B2 | 9/2005 | De Block et al. |
| 6,966,096 B2 | 11/2005 | Baseotto et al. |
| 7,028,368 B2 | 4/2006 | Lee et al. |
| 7,055,207 B2 | 6/2006 | Coughlin |
| 7,150,066 B1 | 12/2006 | Huang |
| 7,207,082 B2 | 4/2007 | Lee |
| 7,228,588 B2 | 6/2007 | Kraemer et al. |
| 7,281,294 B2 | 10/2007 | Wilms et al. |
| 7,287,296 B2 | 10/2007 | Vacher |

(56) References Cited

U.S. PATENT DOCUMENTS

| | | |
|---|---|---|
| 7,451,520 B2 | 11/2008 | Weiler et al. |
| 7,523,522 B2 | 4/2009 | Herring et al. |
| 7,546,660 B2 | 6/2009 | Heinrich et al. |
| 7,581,279 B2 | 9/2009 | Baseotto et al. |
| 7,621,016 B2 | 11/2009 | Verelst et al. |
| 7,774,892 B2 | 8/2010 | Coughlin |
| 8,042,218 B2 | 10/2011 | Moll et al. |
| 2002/0026681 A1 | 3/2002 | Nacamuli |
| 2003/159229 A1 | 8/2003 | Weiler et al. |
| 2004/0019997 A1 | 2/2004 | Baseotto et al. |
| 2004/0025281 A1 | 2/2004 | Baseotto et al. |
| 2004/0123414 A1 | 7/2004 | Lee |
| 2006/0130263 A1 | 6/2006 | Coughlin |
| 2007/0174989 A1 | 8/2007 | Moll et al. |
| 2008/0066254 A1 | 3/2008 | Vacher |
| 2008/0263806 A1 | 10/2008 | Egner-Walter et al. |
| 2009/0199357 A1 | 8/2009 | Thienard |
| 2010/0251503 A1 | 10/2010 | Coughlin |
| 2012/0180244 A1 | 7/2012 | Kim et al. |
| 2012/0227206 A1 | 9/2012 | Depondt |
| 2012/0233801 A1 | 9/2012 | Coart et al. |
| 2013/0025084 A1 * | 1/2013 | Tolentino et al. .......... 15/250.32 |

FOREIGN PATENT DOCUMENTS

| | | |
|---|---|---|
| DE | 1505397 A1 | 10/1969 |
| DE | 1655410 A1 | 8/1971 |
| DE | 2311293 A1 | 9/1974 |
| DE | 2336271 A1 | 2/1975 |
| DE | 2350302 A1 | 4/1975 |
| DE | 2353368 A1 | 5/1975 |
| DE | 2640399 A1 | 3/1977 |
| DE | 19729865 A1 | 1/1999 |
| DE | 19734843 A1 | 2/1999 |
| DE | 19814609 A1 | 10/1999 |
| DE | 10335393 A1 | 9/2004 |
| EP | 0594451 A1 | 4/1994 |
| FR | 1069875 A | 2/1954 |
| FR | 2377302 A1 | 8/1978 |
| FR | 2515121 A1 | 4/1983 |
| GB | 878951 A | 10/1961 |
| GB | 1012902 A | 12/1965 |
| GB | 1489791 | 4/1975 |
| GB | 1395918 A | 5/1975 |
| GB | 2308542 A | 7/1997 |
| JP | 2007-331748 A | 12/2007 |
| WO | 0021809 A1 | 4/2000 |
| WO | 02087935 A1 | 11/2002 |
| WO | 03051696 A1 | 6/2003 |
| WO | 03080409 A1 | 10/2003 |
| WO | 2004048163 A1 | 6/2004 |
| WO | 2004076251 A1 | 9/2004 |
| WO | 2004076252 A1 | 9/2004 |
| WO | 2006069648 A1 | 7/2006 |
| WO | 2009133979 A1 | 11/2009 |
| WO | 2011131395 A2 | 10/2011 |

* cited by examiner

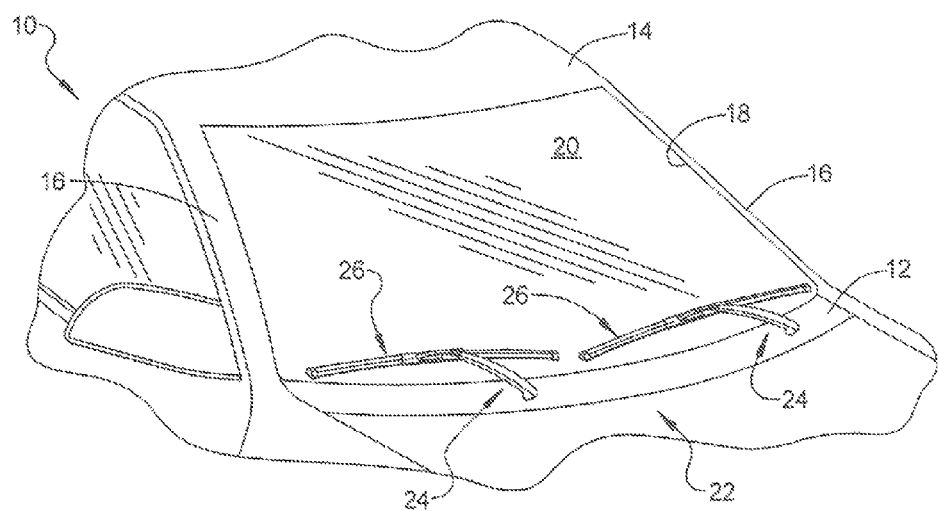
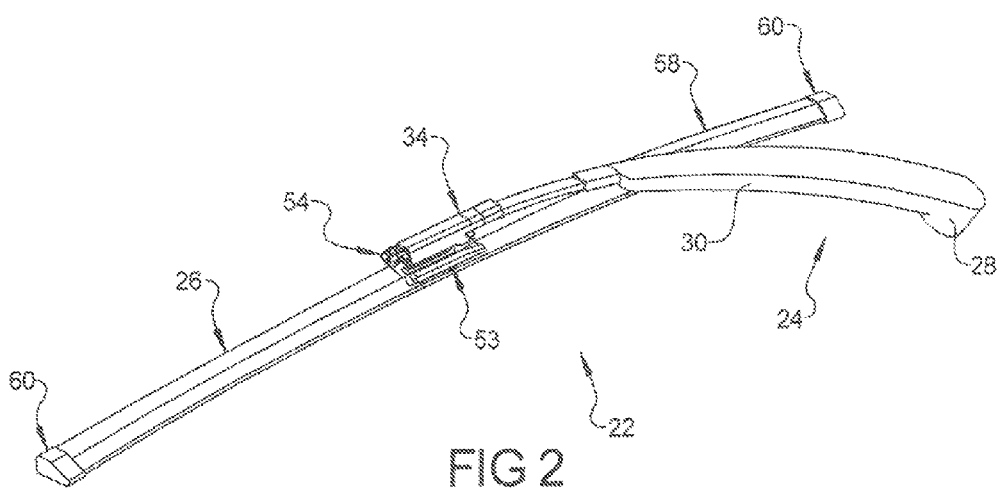

WIPER COUPLER ADAPTER AND WIPER ASSEMBLY INCORPORATING SAME

BACKGROUND OF THE INVENTION

1. Field of the Invention

The present invention relates generally to wiper assemblies and, more specifically, to a wiper coupler adaptor and wiper assembly incorporating same for use in connecting the wiper assembly to a wiper arm of a vehicle.

2. Description of the Related Art

Conventional wiper assemblies known in the related art include some type of wiper assembly mounted to a wiper arm which, in turn, is mounted adjacent a windshield and pivotally driven to impart reciprocating motion to the wiper assembly across the windshield. The wiper assembly includes a rubber wiping element that contacts the windshield across the surface to be wiped. Generally, the wiper assembly may be classified into one of two categories commonly referred to as "tournament-style" wiper assemblies and "beam-blade" wiper assemblies.

Beam-blade style wiper assemblies include a single elongated, homogeneous strip forming a spring backbone. The backbone is operatively coupled to the wiper arm by a fixed connecting formation at a central position. In a beam-blade style wiper assembly, the reciprocally driven wiper arm applies a downward force and moves the wiper assembly across the surface to be wiped, which is generally the windshield. The backbone is curved along a single plane which is the same plane of curvature as that defined by the windshield. The wiping element is fixedly secured to the backbone. One example of a beam-blade style wiper assembly can be found in U.S. Pat. No. 6,675,433 issued to Stewart, et al., on Jan. 13, 2004 and assigned to the Assignee of the present invention, Trico Products Corporation.

While beam blade-style wiper assemblies are limited for use with a particular style of wiper arm, the couplet of a beam blade-style wiper assembly is usually designed solely for use with a single type of wiper arm style. A typical adaptor connection, side pinch with a lateral pull or over center, connects the coupler to the attachment member of the wiper arm and can be disassembled during wipe. As a result, it is desirable to provide a coupling adaptor that enhances the retention of the wiper coupler to the wiper arm during operation.

Accordingly, there is a need in the art for a coupler adaptor that operatively attaches a beam blade-style wiper assembly to a wiper arm. In addition, there is a need in the art for a coupler adapter that operatively engages a wiper arm designed for a beam blade-style wiper assembly.

SUMMARY OF THE INVENTION

The present invention overcomes many limitations and disadvantages in the related art in a wiper coupler adaptor, as well as a wiper assembly, for use in connection with an attachment member of a wiper arm. The wiper coupler adaptor includes a pair of sidewalls extending longitudinally and each including a post that extends laterally toward the other and adapted to operatively engage a wiper assembly. The sidewalls include recessed sections adapted to operatively engage rails of an attachment member of a wiper arm, each of the recessed sections having a lip that is adapted to provide a positive stop with respect to one of the rails of the attachment member and a flange that extends outward beyond said lip to provide releasable engagement with the attachment member. The wiper coupler adaptor also includes a deck disposed between the sidewalls to define a rest that is adapted to operatively receive a track between the rails of the attachment member.

One feature of the wiper coupler adaptor includes an elevated platform disposed between the sidewalls that cooperates with the sidewalls and the deck to define an aperture adapted to receive a portion of a bent tab of the attachment member and a snap bridge disposed within the aperture and depending from the elevated platform and including a cantilevered body and a head disposed at a terminal end of the cantilevered body. The head includes a lip depending therefrom that is adapted to receive a portion of the bent tab of the attachment member to prevent undesired rotational release of the wiper coupler adaptor from the attachment member.

Another feature of the wiper coupler adaptor includes the deck including a cantilevered beam disposed between each the flange to define a distal end of the deck and having a retention tab that is adapted to provide an interference fit against the track of the attachment member when the cantilevered beam is disposed within the track of the attachment member to allow for tolerance play from the wiper arm and wiper assembly.

Yet another feature of the wiper coupler adaptor includes a lock bridge extending laterally between each the flange to form a full solid bridge and laterally outward past each flange and adapted to engage a trailing edge of guides on the rails of the attachment member to secure the wiper assembly from a lateral pull to disassemble. One or more of these features may be combined in the wiper coupler adaptor of the present invention.

Thus, one advantage of the present invention is that a new wiper coupler adaptor is provided to operatively engage a beam blade-style wiper assembly to a wiper arm. Another advantage of the present invention is that the wiper coupler adaptor provides improved blade retention force over existing connections. Yet another advantage of the present invention is that the wiper coupler adaptor is non-conventional to connect the wiper assembly to the wiper arm and enhances the retention to the wiper arm during operation. Still another advantage of the present invention is that the wiper coupler adaptor remains affixed to the wiper arm in which a wiper assembly first locks into the adaptor and snaps over to secure the wiper arm to the wiper assembly. A further advantage of the present invention is that the wiper coupler adaptor may have a full solid bridge at an end thereof that secures the wiper assembly from a lateral pull to disassemble. Yet a further advantage of the present invention is that the wiper couplet adaptor may have a snap bridge that securely locks the wiper arm in place and prevents rotational pull off of the wiper assembly. Still a further advantage of the present invention is that the wiper coupler adaptor may have a retention tab that puts pressure on the wiper arm to allow for tolerance play from the wiper arm and wiper assembly.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 1 is a partial perspective view of a front of a vehicle having a pair of wiper assemblies pivotally mounted for reciprocal movement across a windshield of the vehicle.

FIG. 2 is an enlarged perspective view of one of the wiper assemblies of FIG. 1.

DETAILED DESCRIPTION OF THE PREFERRED EMBODIMENT(S)

Figure 3:
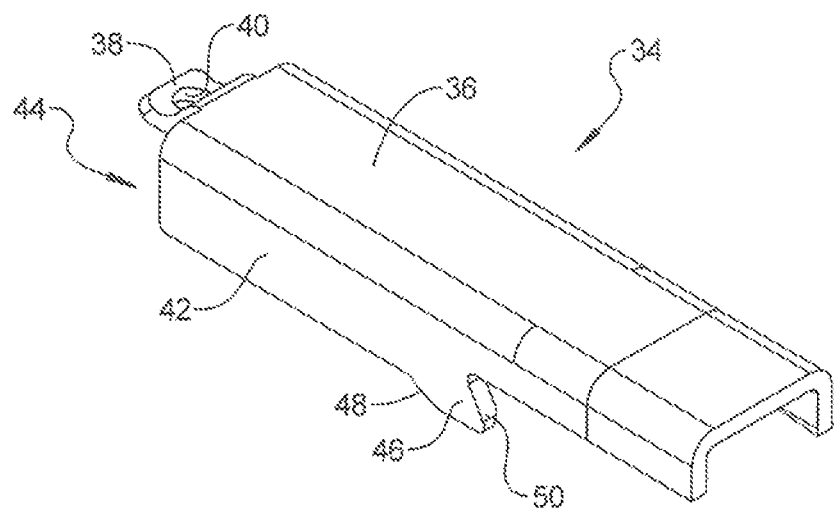
FIG. 3 is a perspective view of an attachment member of a wiper arm for attachment to the wiper assembly of FIG. 2.

Referring now to the figures, where like numerals are used to designate like structure, a portion of a vehicle is schematically illustrated at 10 in FIG. 1. The vehicle 10 includes a cowl 12, a roof 14, and a pair of laterally spaced, front or "A" pillars 16 extending between the roof 14 and the cowl 12. The A-pillars 16, roof 14, and cowl 12 cooperate to define a generally rectangular opening 18 in which is supported a curved or "swept back" glass windshield 20.

A wiper system is generally indicated at 22 in FIG. 1 and is employed in clean the windshield 20. The wiper system 22 includes a wiper arm generally indicated at 24, and a wiper assembly, generally indicated at 26. Those having ordinary skill in the art will appreciate that a wiper system 22 may include more than one wiper arm 24 and more than one wiper assembly 26. By way of example and as indicated in FIG. 1, a wiper system 22 may include a pair of wiper arms 24 and wiper assemblies 26, which correspond to the driver and passenger side of the vehicle 10.

Referring to FIG. 2, the wiper arm 24 includes a pivot end 28 operatively attached to an electrical motor (not shown) to move the wiper arm 24 across the surface to be wiped in an oscillating manner. The wiper arm 24 further includes an elongate body 30 that extends outward from the pivot end 28 and an attachment member 34, described in greater detail below, at a tree end of the elongate body 30. The elongate body 30 includes a predetermined length to direct the wiper assembly 26 across the appropriate surface area. Accordingly, it will be appreciated that the predetermined length of the elongate body 30 will vary depending on the surface area to be wiped. Furthermore, those having ordinary skill in the art will appreciate that the elongate body 30 may be jointed tor movement away from the surface to be wiped in order to facilitate replacement of the wiper assembly 26 when worn or to perform other maintenance or repair to the wiper system 22 or adjacent area of the vehicle 10. In addition to these elements, the wiper arm 24 may further include a biasing member (not shown), such as a spring, to provide a biasing force that facilitates contact between the wiper assembly 26 and the windshield 20 of the vehicle 10.

Referring to FIG. 3, the wiper arm 24 further includes an attachment member, generally indicated at 34, disposed at or adjacent to the end of the elongate body 30, opposite the pivot end 28. The attachment member 34 is adapted to operatively engage the wiper assembly 26, as will be described in greater detail below. The attachment member 34 includes a base 36 and bent tab 38 extending longitudinally outward from the base 36 and having an aperture 40 extending therethrough. The attachment member 34 further includes a pair of rails 42 depending from the base 36 and aligned with respect to each other. The base 36 and rails 42 cooperate to define a track, generally indicated at 44, to operatively receive a portion of the wiper assembly 26, as will be described in greater detail below. Each of the rails 42 includes a guide 46 that extends linearly downward relative to the rails 42. Each of the guides 46 includes a leading edge 48 and a trailing edge 50, the function of each will be described in greater detail below. The trailing edge 50 is angled relative to the base 36, such that the leading edge 48 and the trailing edge SO form an acute angle. However, those having ordinary skill in the art will appreciate that trailing edge 50 may also extend substantially perpendicular relative to the base 36 without departing from the scope of the invention.

The wiper arm 24 having the attachment member 34 that includes the structure described above is commonly employed for connection with a beam blade-style wiper assembly 26 and does not form part of this invention. Rather, those having ordinary skill in the art will appreciate that the present invention is a wiper coupler adaptor and beam blade-style wiper assembly, described in greater detail below, that operatively attaches to the attachment member 34 (exemplarily illustrated in FIGS. 2, 3, 9, 10 and 11). It should also be appreciated that the wiper coupler adaptor of the present invention may be employed for attachment to a tournament-style wiper assembly (not shown).

Figure 4:
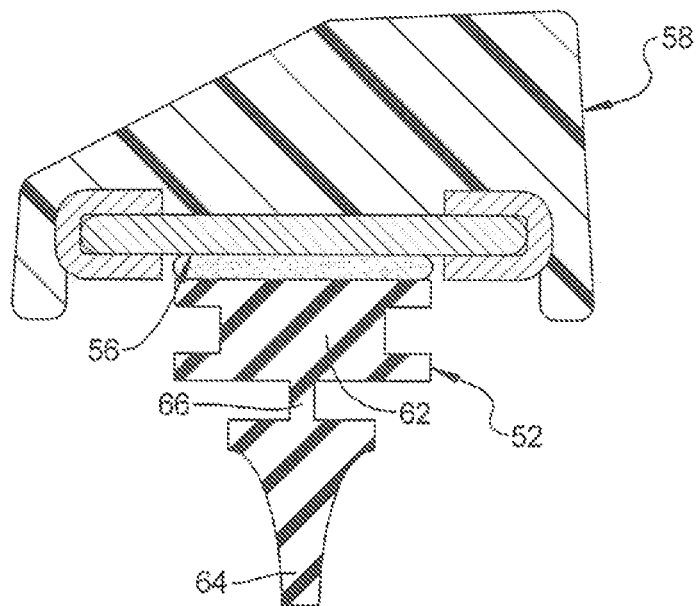
FIG. 4 is a fragmentary elevational view of the wiper assembly of FIG. 2.

Referring to FIGS. 2 and 4, the wiper assembly 26 includes a wiping element, generally indicated at 52, that is adapted to contact the surface of the vehicle 10 to be wiped, in this representative example, the windshield 20. In addition, the wiper assembly 26 also includes a wiper coupler, generally indicated at 53, connected to a beam 56 to be described of the wiper assembly 26 and a wiper coupler adaptor, generally indicated at 54, that acts to interconnect the wiper coupler 53 of the wiper assembly 26 and the attachment member 34 of the wiper arm 24. The wiper assembly 26 also includes at least one elongated beam, generally indicated at 56, that defines a longitudinal axis and that acts to support the wiping element 52. In the representative embodiment illustrated herein, the beam 56 is generally rectangular in shape and extends longitudinally. The wiping element 52 is attached to a bottom surface of the beam 56 by a suitable mechanism such as an adhesive. However, those having ordinary skill in the art will appreciate from the description that follows that the beam 56 may be either monolithic or defined by a pair of rails. The wiper assembly 26 may also include an airfoil assembly, generally indicated at 58, and a pair of end caps, generally indicated at 60, both according to one embodiment of the present invention. It should be appreciated that the attachment member 34 is operatively attached to the beam blade-style wiper assembly 26 via the wiper coupler adaptor 54.

As illustrated in FIG. 4, the wiping element 52 includes an upper section 62 and a lower section 64 that are partitioned by a longitudinally extending bridge portion 66. The bridge portion 66 provides flexibility between the upper section 62 and lower section 64 during operational movement of the wiper assembly 26 across the surface to be wiped. The wiping element 52 has a predetermined length corresponding to particular application and is often manufactured through an extrusion process, which enables the length of the wiping element 52 to be easily adjusted without a substantial increase to manufacturing expense. Furthermore, while the wiping element 52 of the present invention is constructed from a flexible rubber, those having ordinary skill in the art will appreciate that it may be constructed from any flexible material such as silicone or other polymer without departing from the scope of the present invention.

The beam 56 may be constructed from a resiliency flexible material, such as spring steel or a polymer, and is adapted to apply force from an intermediate position between first and second longitudinal ends to the first and second longitudinal ends. More specifically, the beam 56 receives force from the spring-loaded wiper arm 24 at an intermediate position and distributes this force across the span of the beam 56 toward the first and second longitudinal ends. To that end, the beam 56 may be curved longitudinally with a predetermined radius of curvature. This predetermined radius of curvature is sometimes referred to in the related art as a "free form" radius of curvature. Accordingly, the curvature of the beam 56 may be symmetrical or asymmetrical depending on the force requirements and the contour of the windshield 20. The flexible, free form, pre-curved beam 56 straightens out when the wiper arm 24 applies a force thereto to flatten the beam 56 and directs the wiping element 52 to contact the windshield 20. Thus, the elongated beam 56 includes a free-form curvature that ensures force distribution on windshields having various curvatures that effects proper wrapping about the windshield 20.

As illustrated throughout the figures, the beam 56 has a substantially constant width and may have a constant thickness throughout the length between the first and second longitudinal. The constant width and thickness ate adapted to provide high lateral and torsional stiffness to avoid lateral and torsional deflection, which causes the wiping element 26 to stick/slip ("chatter") on the windshield 20 during operation. Thus, the cross-section of the beam 56 has a generally rectangular outer profile that makes the elongated beam 36 easier to manufacture. More specifically, where the beam 56 is constructed from metal, such as spring steel, the tools and machinery used to manufacture the beam 56 are less complicated than that required to manufacture having varying widths and/or thicknesses. Furthermore, where the beam 56 is constructed from a polymer, such as a thermoplastic elastomer, the tools and extrusion process machinery are also less complicated than those employed to manufacture beams having varying widths and/or thicknesses. However, those having ordinary skill in the art will appreciate that the beam 56 illustrated herein may include a varying thickness and/or width without departing from the scope of the present invention. By way of example, the width and/or thickness of the beam 56 may taper linearly from the beam center, sinusoidally, parabolically, or asymmetrically. Additionally, the beam 56 is illustrated in the figures as a single, integral piece of material such that it defines a consolidated cross-section. However, those having ordinary skill in the art will appreciate that the beam 56 may be formed into a single piece by a plurality of laminates.

Referring to FIGS. 2 and 5 through 11, the wiper assembly 26 further includes a wiper coupler adaptor, generally indicated at 54, that is operatively mounted to the wiper coupler 53 of the wiper assembly 26 and is employed tor connection to the attachment member 34 of the wiper arm 24. As illustrated in one embodiment, the wiper coupler adaptor 54 includes a pair of sidewalls 74. Each of the sidewalls 74 defines a surface 76 disposed generally opposed relative to the other. The opposed surfaces 76 include a recessed section 78 adapted to operatively engage the rails 42 of the attachment member 34. The recessed section 78 is partially defined within the opposed surfaces 76 by a lip 80 that is adapted to provide a positive stop with respect to the rails 42 of the attachment member 34 when the wiper assembly 26 is attached to the wiper arm 24.

Each recessed section 78 is further defined by a flange 82 that extends longitudinally outward beyond the lip 80 to provide releasable engagement with the attachment member 34. The wiper coupler adaptor 54 also includes a lock bridge 84 extending between the flanges 82. The lock bridge 84 extends laterally outward past the flanges 82 and has ends 86 adapted to engage the trailing edge 50 of the guides 46 and thereby facilitate the releasable engagement between the flange 82 and the guides 46 of the attachment member 34. The recessed section 78 further includes at least one raised façade 88 to provide an interference fit between the wiper coupler adaptor 54 and the rails 42 of the attachment member 34. Those having ordinary skill in the art will appreciate that the raised façade 88 also provides additional support to the sidewalls 74 and that the recessed section 78 may include more than one raised façade 88.

Figure 7:
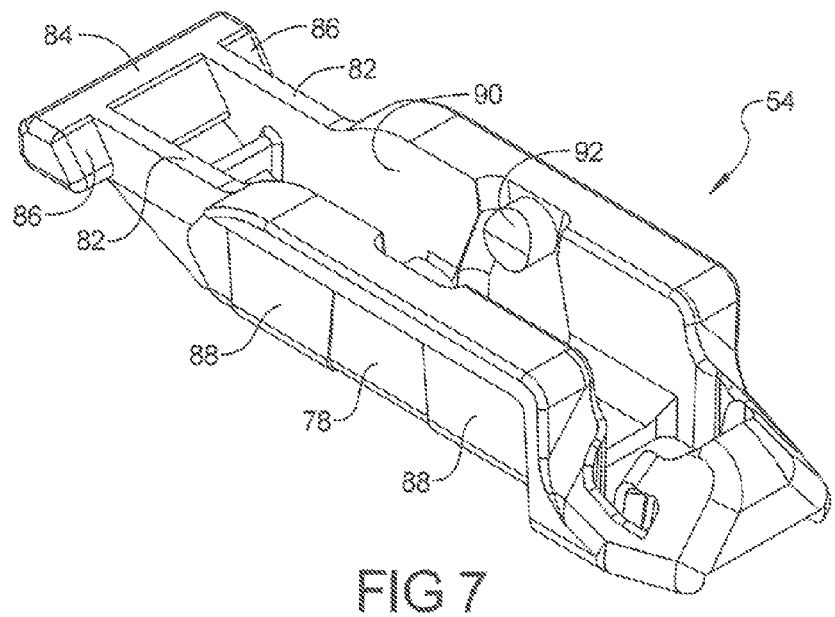
FIG. 7 is a bottom perspective view of the wiper coupler adaptor of FIG. 5 in accordance with the present invention.
Figure 8:
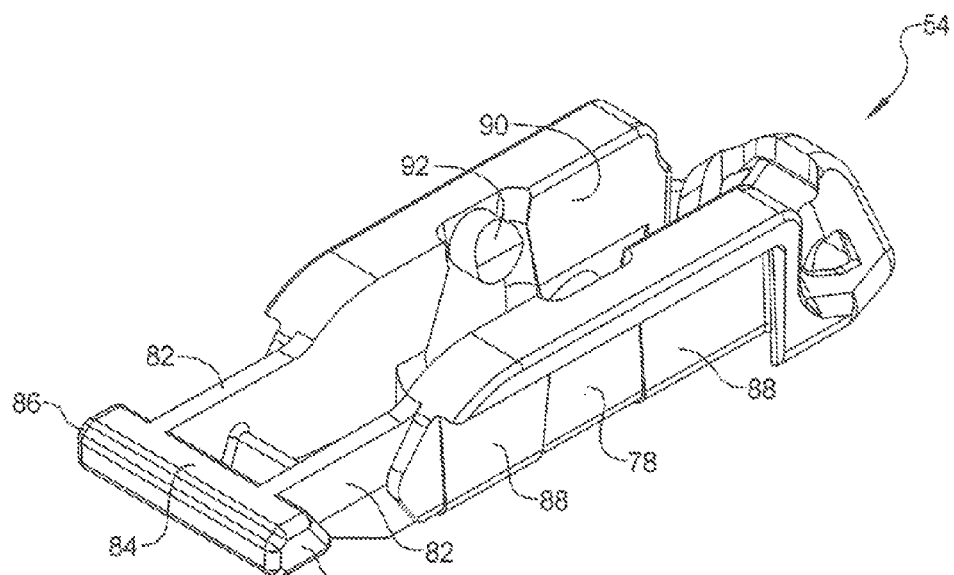
FIG. 8 is another bottom perspective view of the wiper coupler adaptor of FIG. 5 in accordance with the present invention.

As illustrated in FIGS. 7 and 8, each of the sidewalls 74 further includes an inward surface 90 facing each other. The inward surfaces 90 include posts 92 that extend transversely or laterally from their respective inward surface 90 and toward each other. The posts 92 operatively engage aligned bores 94 of the wiper coupler 53 and provide a bearing surface about which the wiper coupler adaptor 54 and wiper coupler 53 may pivot relative to each other.

Referring to FIGS. 5 through 11, the wiper coupler adaptor 54 further includes a deck, generally indicated at 96, disposed between the sidewalls 74. The deck 96 cooperates with the recessed sections 78 of the sidewalls 74 to define a rest, generally indicated at 98, that is adapted to operatively receive the track 44 of the attachment member 34. The deck 96 includes a cantilevered beam 100 that is disposed between the flanges 82 to define a distal end 102 of the deck 96. The cantilevered beam 100 includes a raised portion or retention tab 104 that is adapted to provide an interference fit against the track 44 of the attachment member 34, such that the cantilevered beam 100 is entirely disposed within the track 44 when the wiper coupler adaptor 54 is operatively attached to the wiper arm 24.

The deck 96 further includes a bridge 106 disposed between the sidewalls 74. The bridge 106 provides a stop to prevent undesired disconnect between the wiper arm 24 and the wiper coupler adaptor 54. More specifically, should the lock bridge 84 unintentionally disengage from the guides 46, the bridge 106 will stop the linear movement of the bent tab 38 relative to the wiper coupler adaptor 54, so as to prevent the wiper arm 24 from separating from the wiper assembly 26. Those having ordinary skill in the art will appreciate that the bridge 106 further provides structural support between the sidewalls 74.

Figure 5:
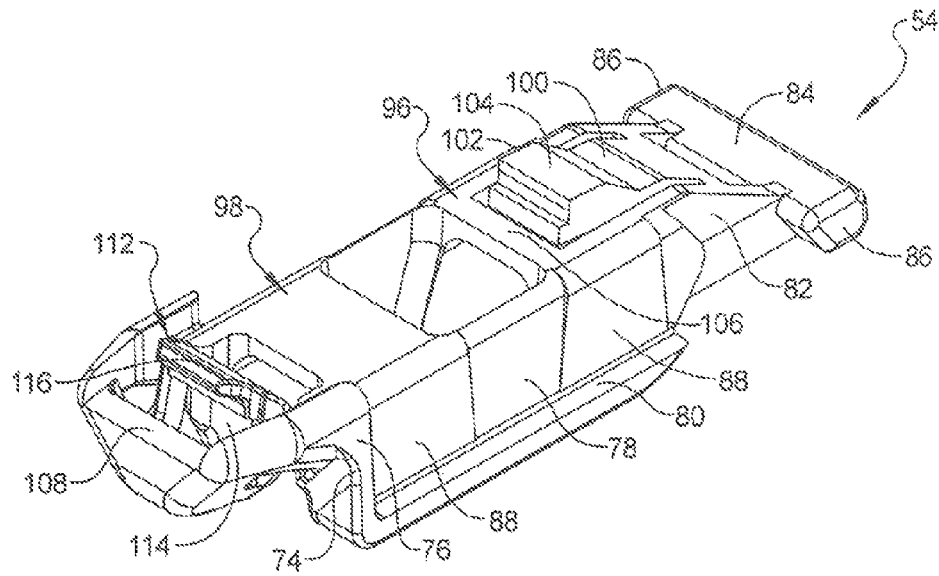
FIG. 5 is a top perspective view of a wiper coupler adaptor, according to the present invention, for connecting the wiper assembly of FIG. 2 to the attachment member of the wiper arm of FIG. 3.
Figure 6:
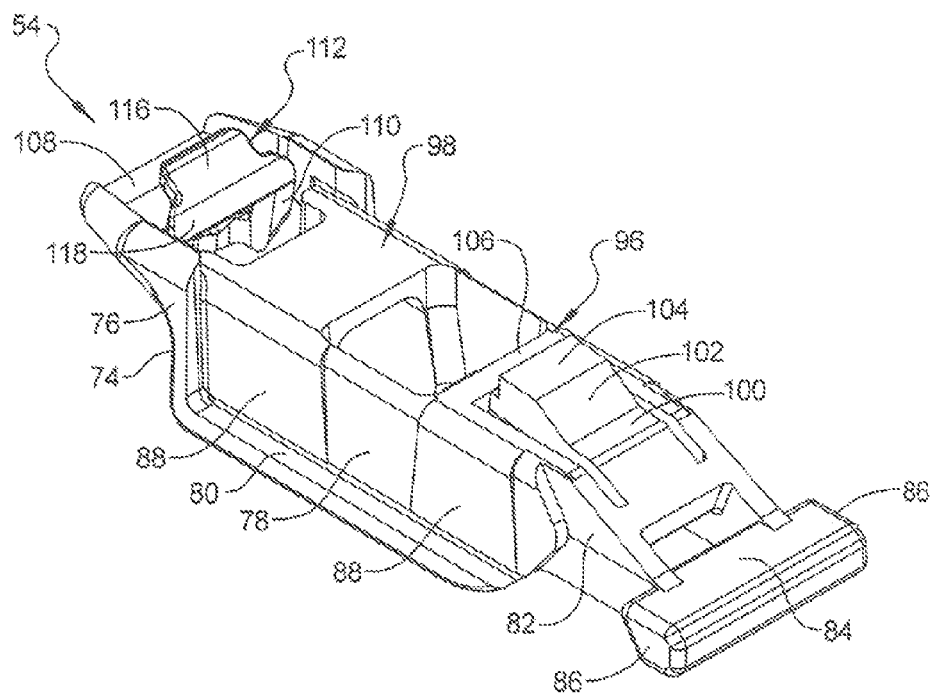
FIG. 6 is another top perspective view of the wiper coupler adaptor of FIG. 5 in accordance with the present invention.

As illustrated in FIGS. 5 and 6, the wiper coupler adaptor 54 includes an elevated platform 108 disposed between the sidewalls 74 that cooperates with the sidewalls 74 and the bridge 106 to define an aperture 110 therebetween. Those having ordinary skill in the art will appreciate that the elevated platform 108 additionally provides structural support between the sidewalls 74. The wiper coupler adaptor 54 further includes an engaging member or snap bridge, generally indicated at 112, that is disposed within the aperture 110. The snap bridge 112 depends from the elevated platform 108 and includes a cantilevered body 114 and a head 116 disposed at the terminal end of the cantilevered body 114. The head 116 also includes a lip 118 depending therefrom. The lip 118 is adapted to receive a portion of the bent tab 38 to prevent undesired release of the wiper coupler adapter 54 from the attachment member 34. More specifically, the lip 118 provides an interference fit between a portion of the bent tab 58 and the snap bridge 112.

Figure 9:
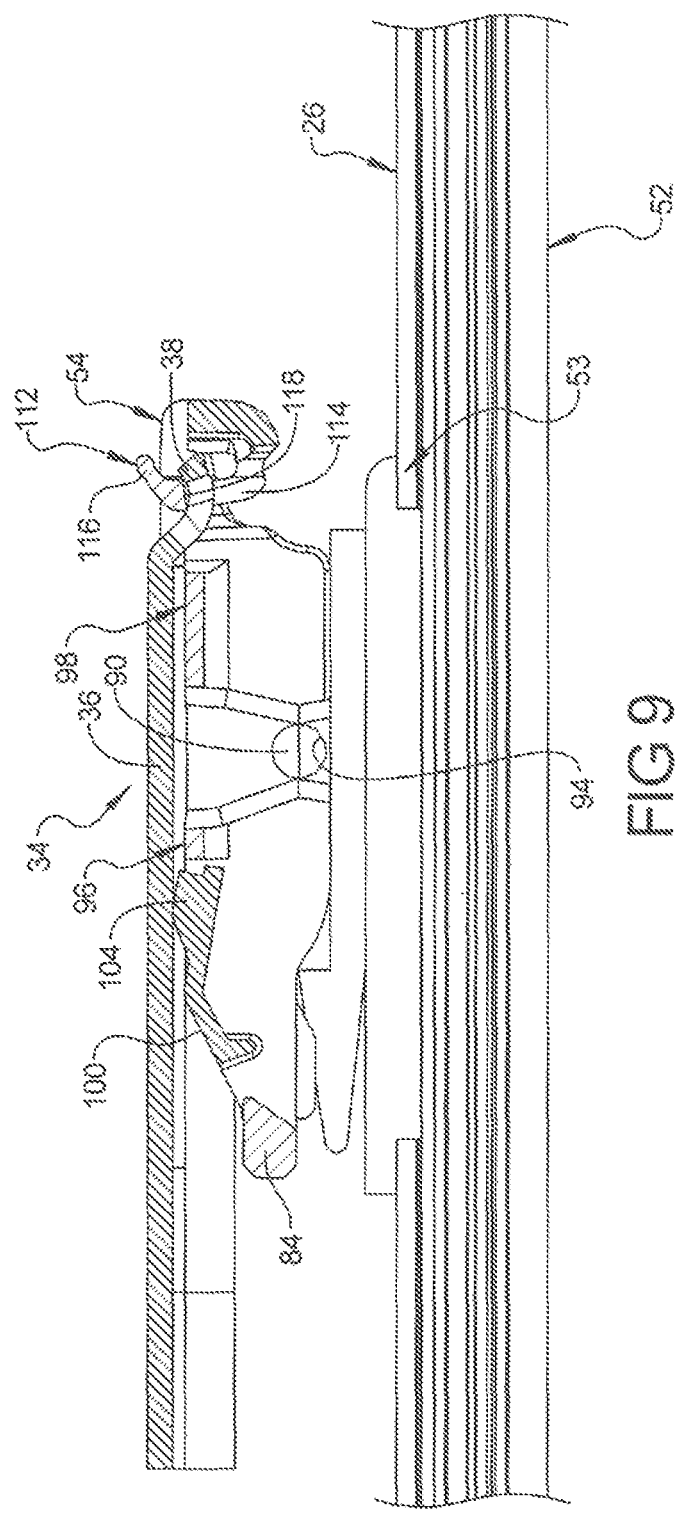
FIG. 9 is a fragmentary perspective view of the wiper coupler adaptor of FIG. 5 operatively engaging a wiper coupler of the wiper assembly and the attachment member of the wiper arm of FIG. 2.
Figure 10:
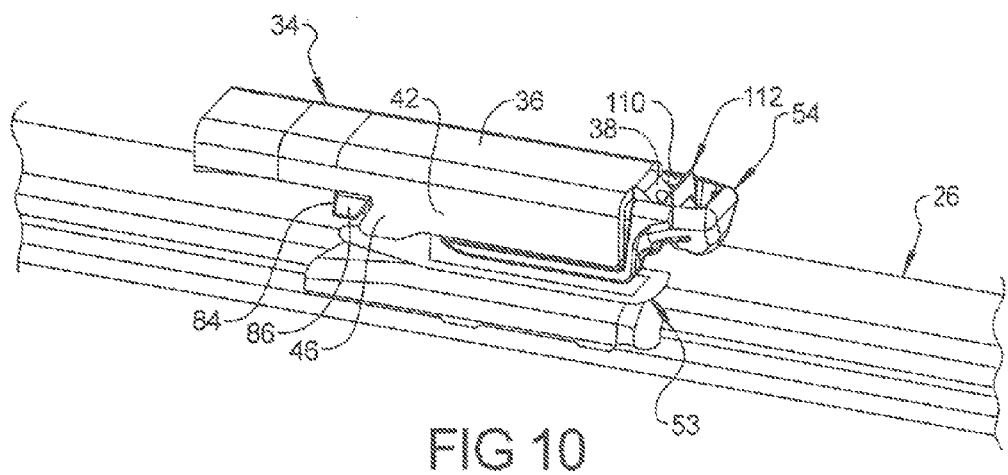
FIG. 10 is a perspective view of the wiper coupler adaptor of FIG. 5 operatively engaging a wiper coupler of the wiper assembly and the attachment member of the wiper arm of FIG. 2 in a first position.
Figure 11:
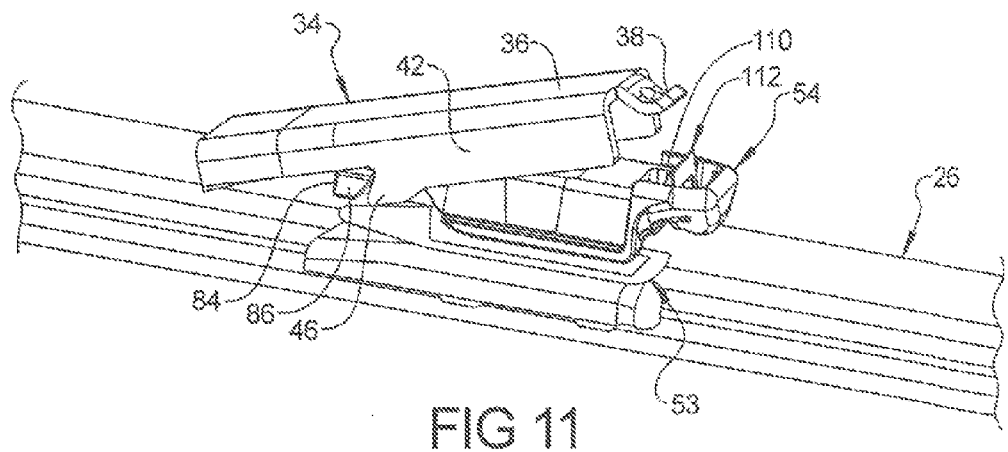
FIG. 11 is a perspective view of the wiper coupler adaptor of FIG. 5 operatively engaging a wiper coupler of the wiper assembly and the attachment member of the wiper arm of FIG. 2 in a second position.
Figure 12:
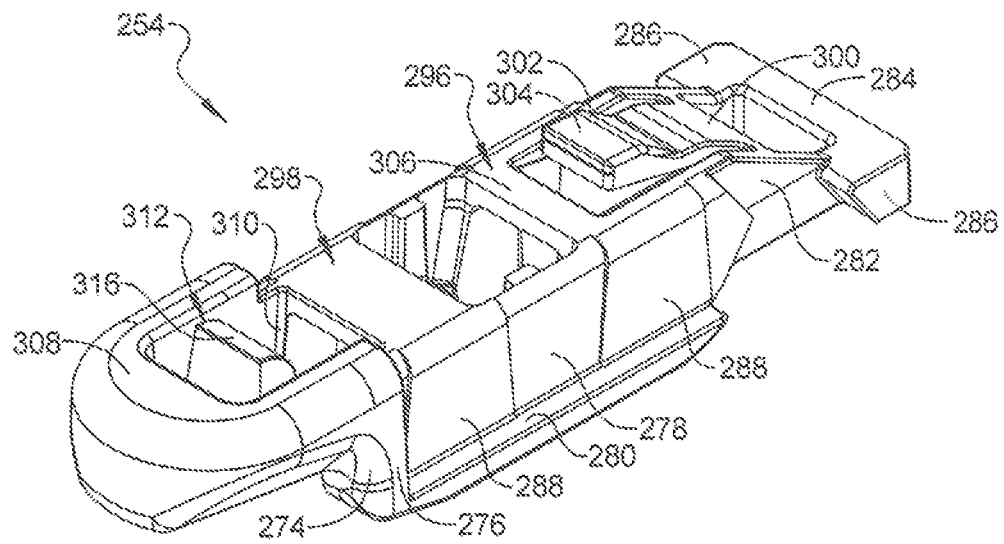
FIG. 12 is a top perspective view of a wiper coupler adaptor, according to another embodiment of the present invention, for connecting the wiper assembly of FIG. 2 to the attachment member of the wiper arm of FIG. 3.
Figure 13:
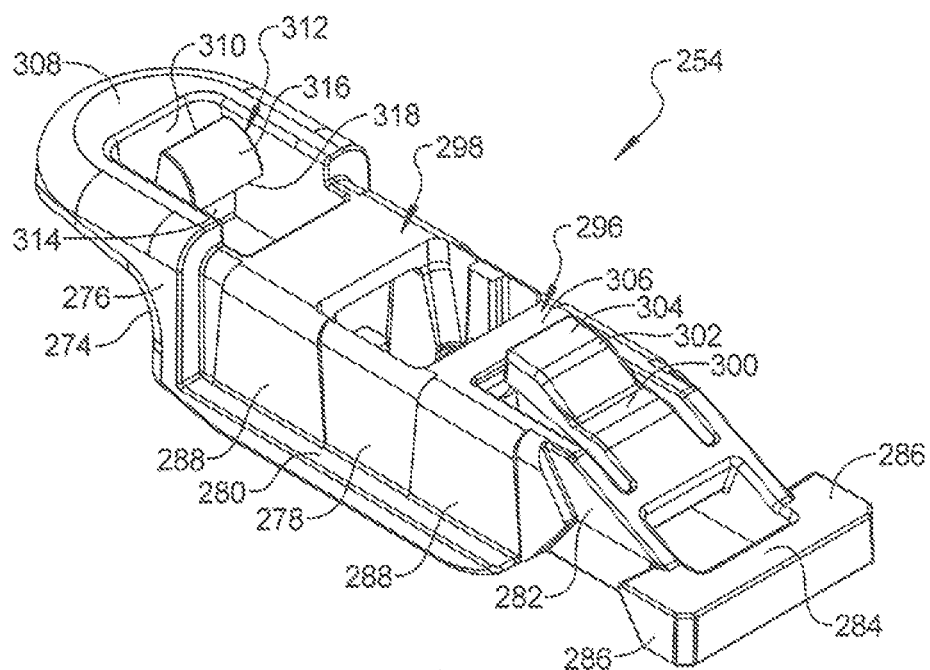
FIG. 13 is another top perspective view of the wiper coupler adaptor of FIG. 12 in accordance with the present invention.

In operation, FIGS. 9 through 11 illustrate the attachment of the wiper assembly 26 to the wiper arm 24. As illustrated in FIG. 9, the wiper coupler adaptor 54 is properly assembled when the wiper coupler adaptor 54 is seated adjacent the wiper coupler 53 and the aligned posts 90 operatively engage the aligned bores 94. As illustrated in FIG. 11, the embodiment of the wiper assembly 26 is properly attached to the wiper arm 24 by seating the guides 46 against the lock bridge 84 and rotating the attachment member 34 toward the wiper coupler adaptor 54. As illustrated in FIG. 10, the bent tab 38 is then inserted within the aperture 110, so as to contact the lip 118, and locks the attachment member 34 in place with the wiper assembly 22. Proper attachment of the wiper assembly 26 is further achieved when the track 44 of the attachment member 34 is sealed on the rest 106. It should be appreciated that the lock bridge 84 at the end of the wiper coupler adaptor 54 secures the wiper assembly 26 from a lateral pull to disassemble. It should also be appreciated that the retention tab 104 puts pressure on the wiper arm 24 to allow for tolerance play from the wiper arm 24 and wiping assembly 26. it should further be appreciated that a full solid bridge for the look bridge 84 is optional.

On the other hand, replacement of the wiper assembly 26 of the present invention illustrated in FIGS. 10 and 11 is accomplished by applying force to the head 116 in a direction toward the elevated platform 108, thereby disengaging the bent tab 38 from contact with the lip 118 and rotating the wiper assembly 26 such that the elevated platform 108 moves away from the bent tab 38. Removal of the wiper assembly 26 from the wiper arm 24 is achieved when the lock bridge 84 disengages from the trailing edge 50 of the guides 46.

Another embodiment of the wiper coupler adaptor 54, according to the present invention, is generally indicated at 254 in FIGS. 12 through 15 where like numerals, increased by 200 with respect to the embodiment of the invention illustrated in FIGS. 5 through 8, are used to designate like structure. The wiper coupler adaptor 254 as shown in FIGS. 12 through 15 includes similar structure as the wiper coupler adaptor 54 shown in FIGS. 5 through 8.

Similar to the embodiment illustrated in FIGS. 5 through 8, the wiper coupler adaptor 254 includes a pair of sidewalls 274. Each of the sidewalls 274 defines a surface 276 disposed generally opposed relative to the other. The opposed surfaces 276 include a recessed section 278 adapted to operatively engage the rails 42 of the attachment member 34. The recessed section 278 is partially defined within the opposed surfaces 276 by a lip 280 that is adapted to provide a positive stop with respect to the rails 42 of the attachment member 34 when the wiper assembly 26 is attached to the wiper arm 24.

Each recessed section 278 is further defined by a flange 282 that extends longitudinally outward beyond the lip 280 to provide releasable engagement with the attachment member 34. The wiper coupler adaptor 254 also includes a lock bridge 284 extending between the flanges 282. The lock bridge 284 extends laterally outward past the flanges 282 and has ends 286 adapted to engage the trailing edge 50 of the guides 46 and thereby facilitate the releasable engagement between the flanges 282 and the guides 46 of the attachment member 34. The recessed section 278 further includes at least one raised façade 288 to provide an interference fit between the wiper coupler adaptor 254 and the rails 42 of the attachment member 34. Those having ordinary skill in the art will appreciate that the raised façade 288 also provides additional support to the sidewalls 274 and that the recessed section 278 may include more than one raised façade 288.

Figure 14:
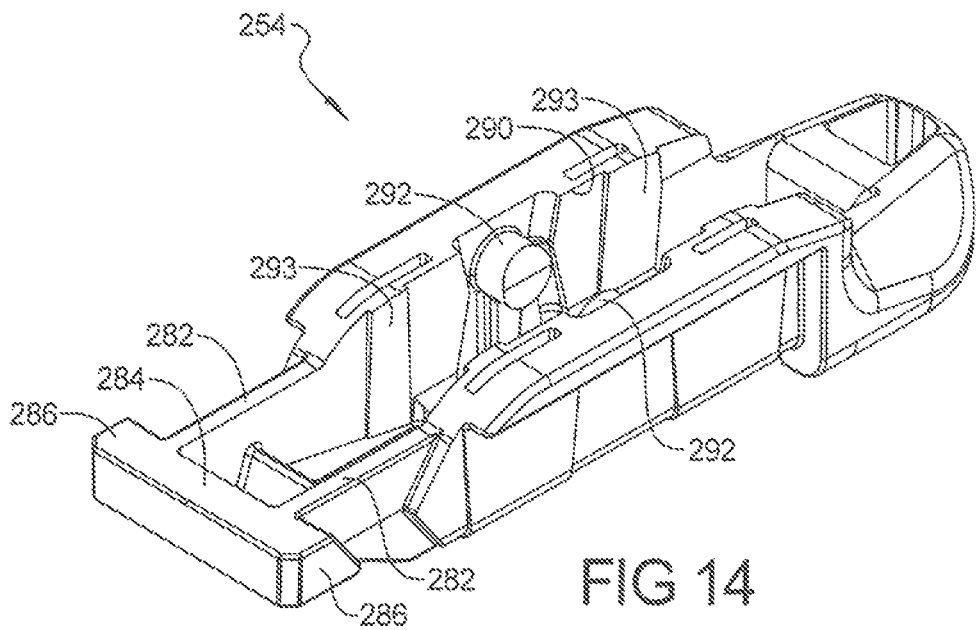
FIG. 14 is a bottom perspective view of the wiper coupler adaptor of FIG. 12 in accordance with the present invention.
Figure 15:
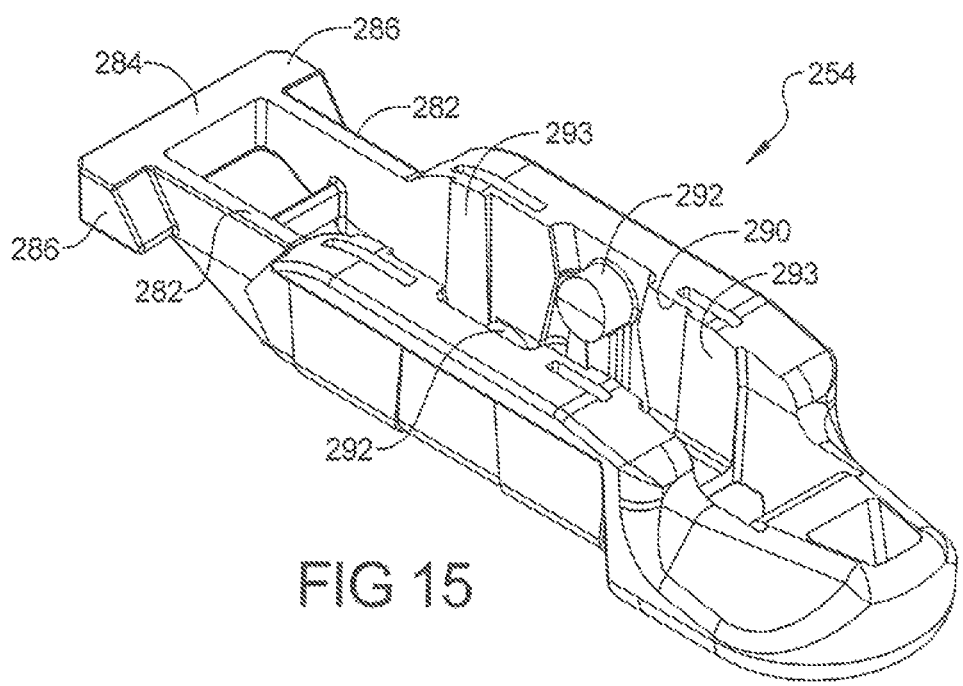
FIG. 15 is another bottom perspective view of the wiper coupler adaptor of FIG. 12 in accordance with the present invention.
Figure 16:
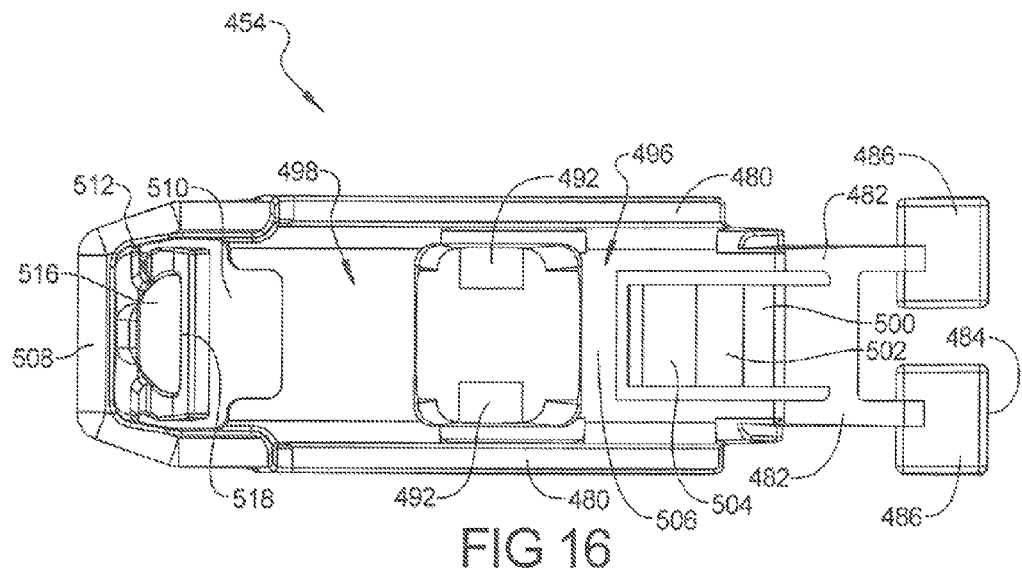
FIG. 16 is a top view of a wiper coupler adaptor, according to yet another embodiment of the present invention, for connecting the wiper assembly of FIG. 2 to the attachment member of the wiper arm of FIG. 3.
Figure 17:
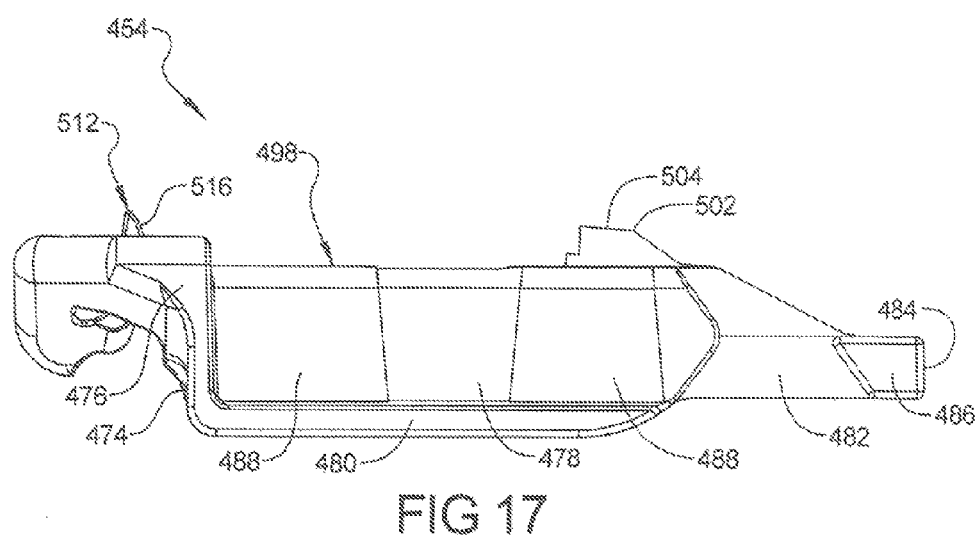
FIG. 17 is a side view of the wiper coupler adaptor of FIG. 16 in accordance with the present invention.

As illustrated in FIGS. 14 and 15, each of the sidewalls 274 further includes an inward surface 290 facing each other. The inward surfaces 290 include posts 292 that extend transversely from their respective inward surface 290 and toward each other. The posts 292 operatively engage the aligned bores 94 of the wiper coupler 53 and provide a bearing surface about which the wiper coupler adaptor 254 and wiper coupler 53 may pivot relative to each other. The inward surfaces 290 further include at least one support rib 294 to provide interference fit between the sidewalls 274 and wiper coupler 53 as well as increase the structural integrity of the sidewalls 274. In one embodiment, the inward surface 290 includes two support ribs 294. However, those having ordinary skill in the art will appreciate that the inward surface 290 may include any number of support ribs 294 without departing from the scope of the invention.

Referring again to FIGS. 12 through 15, the wiper coupler adaptor 254 further includes a deck, generally indicated at 296, disposed between the sidewalls 274. The deck 296 cooperates with the recessed sections 278 of the sidewalls 274 to define a rest, generally indicated at 298, that is adapted to operatively receive the track 44 of the attachment member 34. The deck 296 includes a cantilevered beam 300 that is disposed between the flanges 276 to define a distal end 302 of the deck 206. The cantilevered beam 300 includes a raised portion or retention tab 304 that is adapted to provide an interference fit against the track 44 of the attachment member 34, such that the cantilevered beam 300 is entirely disposed within the track 44 when the wiper coupler adaptor 254 is operatively attached to the wiper arm 24.

The deck 296 further includes a bridge 306 disposed between the sidewalls 274. The bridge 306 provides a stop to prevent undesired disconnect between the wiper arm 24 and the coupler 254. More specifically, should the lock bridge 284 unintentionally disengage from the guides 46, the bridge 306 will stop the linear movement of the bent tab 38 relative to the wiper coupler adaptor 254, so as to prevent the wiper arm 24 from separating from the wiper assembly 26. Those having ordinary skill in the art will appreciate that the bridge 306 further provides structural support between the sidewalls 274.

The wiper coupler 254 includes an elevated platform 308 disposed between the sidewalls 274 that cooperates with the sidewalls 274 and the bridge 306 to define an aperture 310 therebetween. Those having ordinary skill in the art will appreciate that the elevated platform 308 additionally provides structural support between the sidewalls 274. The wiper coupler adaptor 254 further includes an engaging member or snap bridge, generally indicated at 312, that is disposed within the aperture 310. The snap bridge 312 depends from the elevated platform 308 and includes a cantilevered body 314 and a bulbous head 316 disposed at the terminal end of the cantilevered body 314. The bulbous head 316 also includes a lip 318 depending therefrom. The lip 318 is adapted to receive a portion of the bent tab 38 to prevent undesired release of the wiper coupler adaptor 254 from the attachment member 34. More specifically, the lip 318 provides an interference fit between a portion of the bent tab 38 and the snap bridge 312.

The embodiment of the wiper assembly 26 of the present invention illustrated in FIGS. 12 through 15 is properly assembled when the wiper coupler 254 is seated adjacent the wiper coupler 53 and the aligned posts 292 operatively engage the aligned bores 54. The embodiment of the wiper assembly 26 is properly attached to the wiper arm 24 by seating the guides 46 against the lock bridge 284 and rotating the attachment member 34 toward the wiper coupler adaptor 254. The bent tab 38 is then inserted within the aperture 310, so as to contact the lip 318, and locks the attachment member 34 in place with the wiper assembly 22. Proper attachment of the wiper assembly 26 is further achieved when the track 44 of the attachment member 34 is seated on the rest 306. It should be appreciated that the full solid lock bridge 284 at the end of the wiper coupler 254 secures the wiper assembly 26 from a lateral pull to disassemble. It should also be appreciated that the retention tab 304 puts pressure on the wiper arm 24 to allow for tolerance play from the wiper arm 24 and wiping assembly 26.

On the other hand, replacement of the wiper assembly 26 of the present invention illustrated in FIGS. 12 through 15 is accomplished by applying force to the bulbous head 316 in a direction toward the elevated platform 308, thereby disengaging the bent tab 38 from contact with the lip 318 and rotating the wiper assembly 26 such that the elevated platform 308 moves away from the bent tab 38. Removal of the wiper assembly 26 from the wiper arm 24 is achieved when the lock bridge 284 disengages from the trailing edge 50 of the guides 46.

Yet another embodiment of the wiper coupler adaptor 54, according to the present invention, is generally indicated at 454 in FIGS. 16 through 21 where like numerals, increased by 400 with respect to the embodiment of the invention illustrated in FIGS. 3 through 8, are used to designate like structure. The wiper coupler adaptor 454 as shown in FIGS. 16 through 21 includes similar structure as the wiper coupler 54 shown in FIGS. 5 through 8.

Similar to wiper coupler adaptor 54 illustrated in FIGS. 5 through 8, the wiper coupler adaptor 454 includes a pair of sidewalls 474. Each of the sidewalls 474 defines a surface 476 disposed generally opposed relative to the other. The opposed surfaces 476 include a recessed section 478 adapted to operatively engage the rails 42 of the attachment member 34. The recessed section 478 is partially defined within the opposed surfaces 476 by a lip 480 that is adapted to provide a positive stop with respect to the rails 42 of the attachment member 34 when the wiper assembly 26 is attached to the wiper arm 24.

Each recessed section 478 is further defined by a flange 482 that extends outward beyond the lip 480 to provide releasable engagement with the attachment member 34. The wiper coupler adaptor 454 also includes a lock bridge 484 extending between the flanges 482. The lock bridge 484 extends laterally outward past the flanges 482 and has ends 486 adapted to engage the trailing edge 50 of the guides 46 and thereby facilitate the releasable engagement between the flanges 482 and the guides 46 of the attachment member 34. The recessed section 478 further includes at least one raised façade 488 to provide an interference fit between the coupler 454 and the rails 42 of the attachment member 34. Those having ordinary skill in the art will appreciate that the raised façade 488 also provides additional support to the sidewalls 474 and that the recessed section 478 may include more man one raised façade 488.

Figure 18:
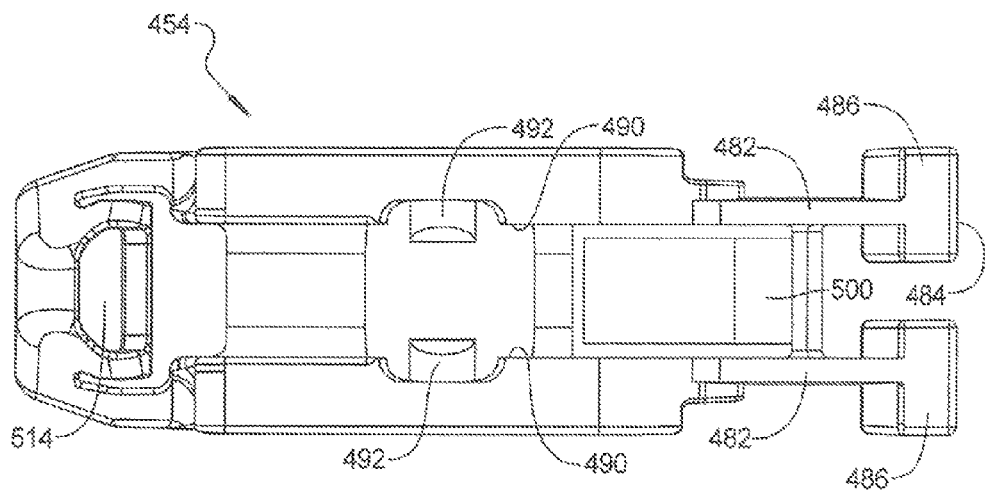
FIG. 18 is a bottom view of the wiper coupler adaptor of FIG. 16 in accordance with the present invention.
Figure 19:
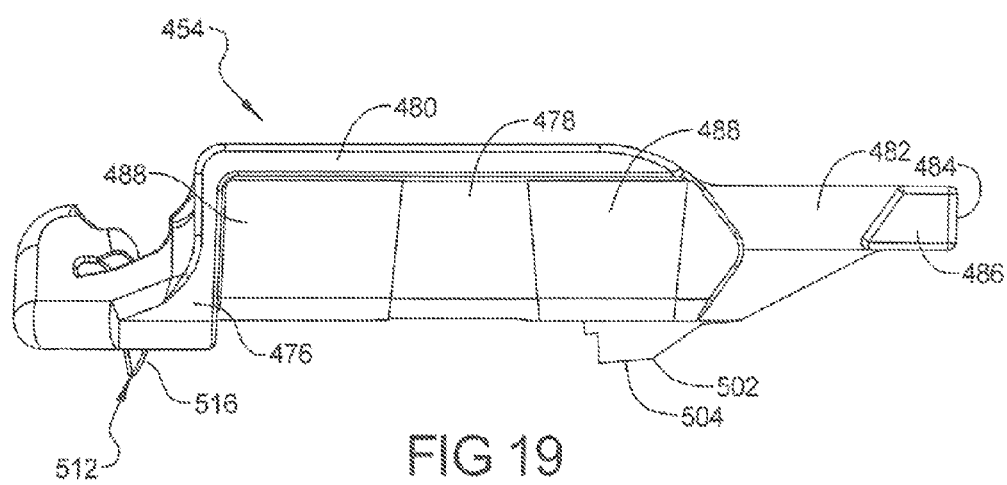
FIG. 19 is another side view of the wiper coupler adaptor of FIG. 16 in accordance with the present invention.
Figure 20:
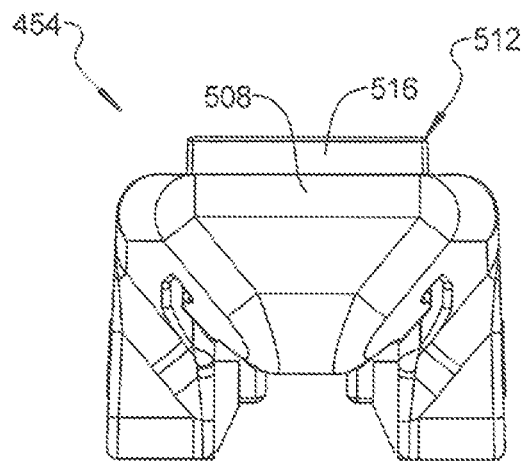
FIG. 20 is an end view of the wiper coupler adaptor of FIG. 16 in accordance with the present invention.
Figure 21:
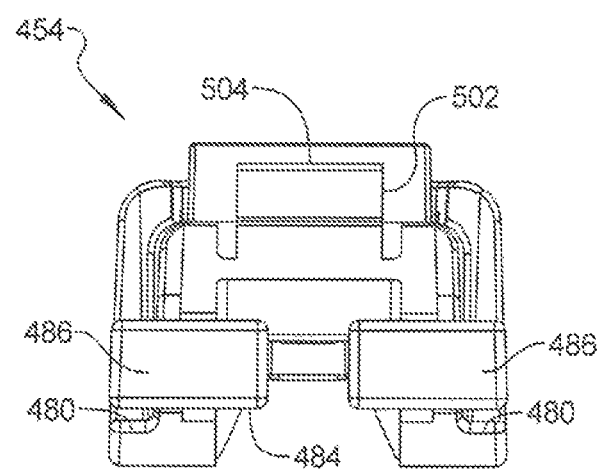
FIG. 21 is another end view of the wiper coupler adaptor of FIG. 16 in accordance with the present invention.

As illustrated in FIG. 18, each of the sidewalls 474 further includes an inward surface 490 facing each other. The inward surfaces 490 include posts 492 that extend transversely from their respective inward surface 490 and toward each other. The posts 492 operatively engage the aligned bores 94 of the wiper coupler 53 and provide a bearing surface about which the wiper coupler 454 and the wiper coupler 53 may pivot relative to each other.

Referring to FIGS. 16 through 21, the wiper coupler adaptor 454 former includes a deck, generally indicated at 496, disposed between the sidewalls 474. The deck 496 cooperates with the recessed sections 478 of the sidewalls 474 to define a rest, generally indicated at 498, that is adapted to operatively receive the track 44 of the attachment member 34. The deck 496 includes a cantilevered beam 500 that is disposed between the flanges 476 to define a distal end 502 of the deck 496. The cantilevered beam 500 includes a raised portion or retention tab 504 that is adapted to provide an interference fit against the track 44 of the attachment member 34, such that the cantilevered beam 500 is entirely disposed within the track 44 when the wiper coupler adaptor 454 is operatively attached to the wiper arm 24.

The deck 496 further includes a bridge 506 disposed between the sidewalls 474. The bridge 506 provides a stop to prevent undesired disconnect between the wiper arm 24 and the wiper coupler adaptor 454. More specifically, should the lock bridge 484 unintentionally disengage from the guides 46, the bridge 506 will stop the linear movement of the bent tab 38 relative to the coupler 454, so as to prevent the wiper arm 24 from separating from the wiper assembly 26. Those having ordinary skill in the art will appreciate that the bridge 506 further provides structural support between the sidewalls 474.

The wiper coupler adaptor 454 includes an elevated platform 508 disposed between the sidewalls 474 that cooperates with the sidewalls 474 and the bridge 506 to define an aperture 510 therebetween. Those having ordinary skill in the art will appreciate that the elevated platform 508 additionally provides structural support between the sidewalls 474. The coupler 454 further includes an engaging member or snap bridge, generally indicated at 512, that is disposed within the aperture 510. The snap bridge 512 depends from the elevated platform 508 and includes a cantilevered body 514 and a head 516 disposed at the terminal end of the cantilevered body 514. The head 516 also includes a lip 518 depending therefrom. The lip 518 is adapted to receive a portion of the bent tab 38 to prevent undesired release of the wiper coupler adaptor 454 from the attachment member 34. More specifically, the lip 518 provides an interference fit between a portion of the bent tab 38 and the snap bridge 512.

The embodiment of the wiper assembly 26 of the present invention illustrated in FIGS. 1 and 2 is properly assembled when the wiper coupler adaptor 454 is seated adjacent the wiper coupler 53 and the aligned posts 492 operatively engage the aligned bores 94. The embodiment of the wiper assembly 26 is properly attached to the wiper arm 24 by seating the guides 46 against the lock bridge 484 and rotating the attachment member 34 toward the wiper coupler adaptor 454. The bent tab 38 is then inserted within the aperture 510, so as to contact the lip 518, and locks the attachment member 34 in place with the wiper assembly 22. Proper attachment of the wiper assembly 26 is further achieved when the track 44 of the attachment member 34 is seated on the rest 506. It should be appreciated that the lock bridge 484 at the end of the wiper coupler adaptor 454 secures the wiper assembly 26 from a lateral pull to disassemble. It should also be appreciated that the retention tab 504 puts pressure on the wiper arm 24 to allow for tolerance play from the wiper arm 24 and wiping assembly 26.

On the other hand, replacement of the wiper assembly 26 of the present invention illustrated in FIGS. 1 and 2 is accomplished by applying force to the bulbous head 516 in a direction toward the elevated platform 508, thereby disengaging the bent tab 38 from contact with the lip 518 and rotating the wiper assembly 26 such that the elevated platform 508 moves away from the bent tab 38. Removal of the wiper assembly 26 from the wiper arm 24 is achieved when the lock bridge 484 disengages from the trailing edge 50 of the guides 46.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A wiper coupler adaptor for releasably attaching a wiper assembly to a wiper arm, said wiper coupler adaptor comprising:
a pair of sidewalls extending longitudinally and each including a post that extends laterally toward the other and adapted to operatively engage a wiper assembly, said sidewalls including recessed sections adapted to operatively engage rails of an attachment member of a wiper arm, each of said recessed sections having a lip that is adapted to provide a positive stop with respect to one of the rails of the attachment member and a flange that extends outward beyond said lip so as to define ends adapted to provide releasable engagement with the attachment member with a lock bridge extending laterally between each said flange to form a solid bridge therebetween, said lock bridge extending laterally outward past each said flange and cooperates with each said flange to define said ends which are adapted to engage a trailing edge of guides on the rails of the attachment member; and
a deck disposed between said sidewalls to define a rest that is adapted to operatively receive a track between the rails of the attachment member, said deck including a cantilevered beam disposed between each said flange to define a distal end of said deck and having a retention tab that is adapted to provide an interference fit against the track of the attachment member when said cantilevered beam is disposed within the track of the attachment member.

2. A wiper coupler adaptor as set forth in claim 1 including an elevated platform disposed between said sidewalls that cooperates with said sidewalls and said deck to define an aperture adapted to receive a portion of a bent tab of the attachment member.

3. A wiper coupler adaptor as set forth in claim 2 including a snap bridge disposed within said aperture and depending from said elevated platform and including a cantilevered body and a head disposed at a terminal end of said cantilevered body, said head including a lip depending therefrom that is adapted to receive a portion of the bent tab of the attachment member to prevent undesired release of said wiper coupler adaptor from the attachment member.

4. A wiper assembly for use in connection with a wiper arm having an attachment member, said wiper assembly comprising:
a wiping element adapted to contact a surface to be wiped;
a structure adapted to operatively engaged said wiping element;
a wiper coupler operatively mounted to said structure; and
a wiper coupler adaptor operatively mounted to said wiper coupler and the attachment member that is adapted to releasably attach said wiper coupler to the attachment member, said wiper coupler adaptor including a pair of sidewalls extending longitudinally and each including a post that extends laterally toward the other and adapted to operatively engage said wiper coupler, said sidewalls including recessed sections adapted to operatively engage rails of an attachment member of a wiper arm, each of said recessed sections having a lip that is adapted to provide a positive stop with respect to one of the rails of the attachment member and a flange that extends outward beyond said lip so as to define ends adapted to provide releasable engagement with the attachment member with a lock bridge extending laterally between each said flange to form a solid bridge therebetween, said lock bridge extending laterally outward past each said flange and cooperates with each said flange to define said ends which are adapted to engage a trailing edge of guides on the rails of the attachment member to secure the wiper assembly from a lateral pull to disassemble; and
a deck disposed between said sidewalls to define a rest that is adapted to operatively receive a track between the rails of the attachment member, said deck including a cantilevered beam disposed between each said flange to define a distal end of said deck and having a retention tab that is adapted to provide an interference fit against the track of the attachment member when said cantilevered beam is disposed within the track of the attachment member.

5. A wiper assembly as set forth in claim 4 wherein said wiper coupler adaptor includes an elevated platform disposed between said sidewalls that cooperates with said sidewalls and said deck to define an aperture adapted to receive a portion of a bent tab of the attachment member.

6. A wiper assembly as set forth in claim 5 wherein said wiper coupler adaptor includes a snap bridge disposed within said aperture and depending from said elevated platform and including a cantilevered body and a head disposed at a terminal end of said cantilevered body, said head including a lip depending therefrom that is adapted to receive a portion of the bent tab of the attachment member to prevent undesired release of said wiper coupler adaptor from the attachment member.

* * * * *